(12) United States Patent
McCausland

(10) Patent No.: US 8,011,639 B2
(45) Date of Patent: Sep. 6, 2011

(54) POPPET TYPE FLOW CONTROL VALVE

(75) Inventor: Andrew John McCausland, Milperra (AU)

(73) Assignee: Goyen Controls Co. Pty Ltd., Milperra, Sydney (AU)

( * ) Notice: Subject to any disclaimer, the term of this patent is extended or adjusted under 35 U.S.C. 154(b) by 77 days.

(21) Appl. No.: 10/569,142

(22) PCT Filed: Jul. 20, 2004

(86) PCT No.: PCT/AU2004/000974
§ 371 (c)(1),
(2), (4) Date: Feb. 21, 2006

(87) PCT Pub. No.: WO2005/010417
PCT Pub. Date: Feb. 3, 2005

(65) Prior Publication Data
US 2006/0283503 A1    Dec. 21, 2006

(30) Foreign Application Priority Data
Jul. 23, 2003    (AU) .................................. 2003903803

(51) Int. Cl.
*F16K 31/122*    (2006.01)
(52) U.S. Cl. ................. 251/31; 251/35; 251/62; 251/63; 251/63.5
(58) Field of Classification Search ..................... 251/25, 251/35, 31, 62, 63, 63.5
See application file for complete search history.

(56) References Cited

U.S. PATENT DOCUMENTS

| | | | |
|---|---|---|---|
| 1,256,648 A * | 2/1918 | Benson .................... 137/543.15 |
| 2,918,250 A * | 12/1959 | Hosking ......................... 251/35 |
| 2,919,714 A | 1/1960 | Mrazek |
| 3,039,491 A * | 6/1962 | Raney ....................... 137/596.15 |
| 3,159,375 A * | 12/1964 | Schrecongost et al. .......... 251/31 |
| 3,792,716 A * | 2/1974 | Sime et al. ..................... 137/492 |
| 4,321,940 A * | 3/1982 | Krechel et al. ............ 137/115.16 |
| 4,482,127 A * | 11/1984 | Hafele ............... 251/25 |
| 4,525,183 A * | 6/1985 | Cordes et al. .................... 96/113 |
| 4,610,423 A * | 9/1986 | Morino ............................ 251/25 |
| 4,655,040 A * | 4/1987 | Parker ............................ 60/602 |
| 5,494,078 A * | 2/1996 | Schulte .................... 137/630.14 |

(Continued)

FOREIGN PATENT DOCUMENTS

WO    01/69110 A1    9/2001

(Continued)

*Primary Examiner* — John Rivell
*Assistant Examiner* — William McCalister
(74) *Attorney, Agent, or Firm* — Daniel N. Daisak

(57) ABSTRACT

A valve of the invention includes a valve body having an inlet, an outlet, and a flow passage connecting the inlet and outlet, the inlet, the outlet and the flow passage being in general axial alignment within the valve body. A valve seat surrounds the flow passage and a valve closure member is movable towards and away from the valve seat to close and open the valve respectively. The valve closure member is a poppet-type closure member axially mounted to a stem. The stem has a plurality of pistons spaced apart along the length thereof, and the valve body has a plurality of cylinders fixed relative thereto, the pistons each being slidable in a respective cylinder. The valve closure member is movable by varying the pressure in the cylinders. Preferably each of the cylinders has an outlet port through a wall thereof which is exposed when the closure member has moved towards or into a fully open position, pressure within said cylinders dissipating through those outlet ports when the outlet ports are exposed.

20 Claims, 4 Drawing Sheets

U.S. PATENT DOCUMENTS

| | | | |
|---|---|---|---|
| 5,906,353 A * | 5/1999 | Someya et al. | 251/58 |
| 5,924,672 A * | 7/1999 | Crochet et al. | 251/63.6 |
| 6,202,671 B1 | 3/2001 | Horstmann | |
| 6,220,272 B1 | 4/2001 | Tavor | |
| 6,357,339 B1 * | 3/2002 | Ejiri | 92/150 |
| 6,386,508 B1 * | 5/2002 | Steil et al. | 251/31 |
| 6,397,892 B1 * | 6/2002 | Pyle et al. | 137/637.2 |
| 6,536,740 B2 * | 3/2003 | Hademenos et al. | 251/63.4 |
| 2006/0283503 A1 * | 12/2006 | McCausland | 137/219 |

FOREIGN PATENT DOCUMENTS

| | | |
|---|---|---|
| WO | 03/053539 A1 | 7/2003 |

* cited by examiner

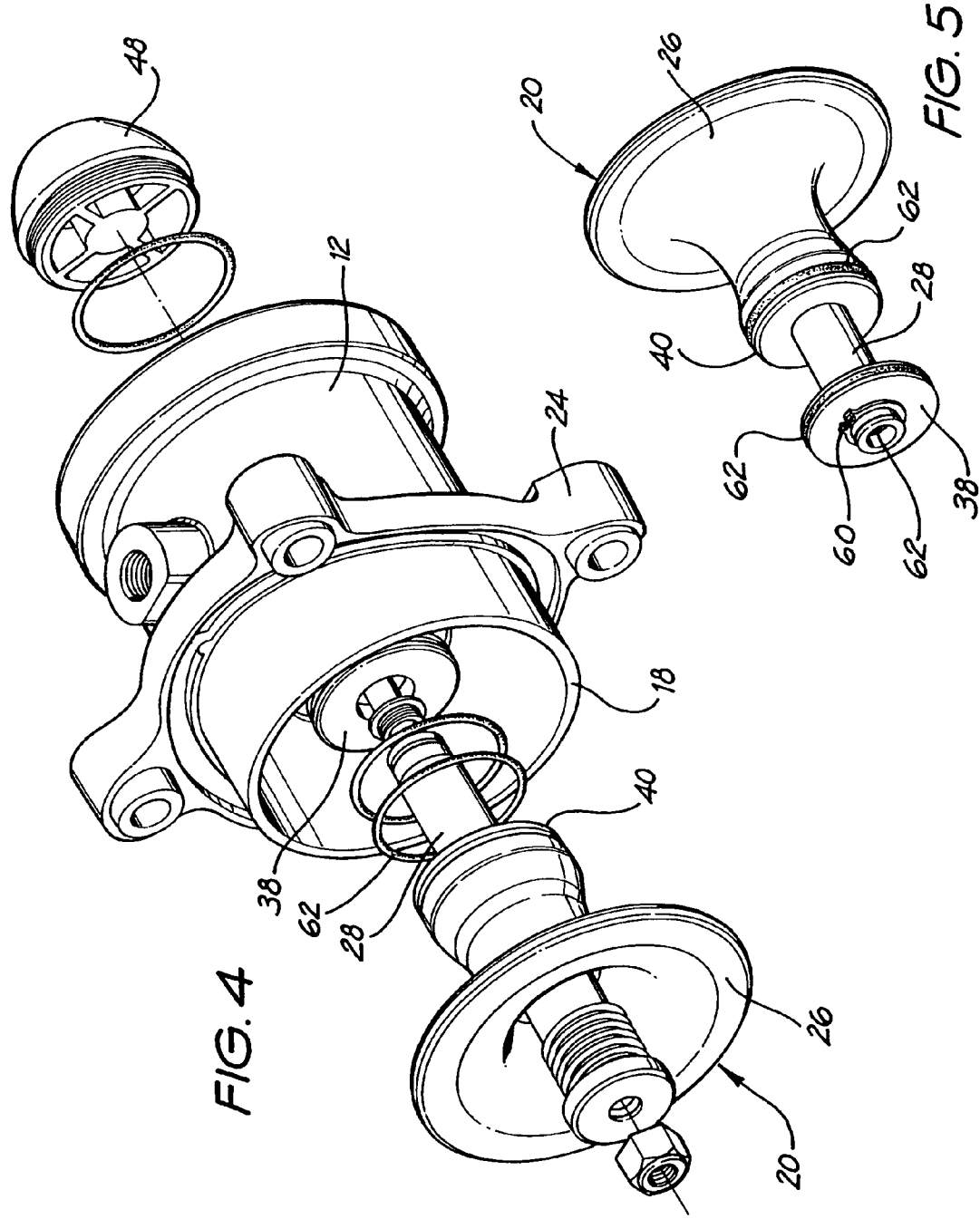

POPPET TYPE FLOW CONTROL VALVE

FIELD OF THE INVENTION

This invention relates to a flow control valve which is able to open and close rapidly, and with which the time of the opening cycle can be controlled relatively precisely. The invention will be particularly described with reference to a flow control valve for reverse pulse cleaning of filter elements, but it is to be understood that the invention can be used in a wide range of other applications.

BACKGROUND OF THE INVENTION

Applicant's co-pending patent application, No PCT/AU02/01716, the specification of which is included herein by reference, describes a poppet type valve for reverse pulse cleaning of filter elements, using a reverse pulse of relatively low pressure air. The low pressure high volume pulse provides an efficient cleaning pulse which has a wide range of applications in the filter cleaning industry. The valve described in the specification employs a high pressure operating fluid for opening and closing the valve.

The efficiency of a reverse pulse cleaning system is determined by a range of factors including, the volume flow rate of the reverse pulse, the peak pressure of the pulse, and the time taken to discharge the pulse volume. In other words, it is the form of the pressure wave which determines the efficacy of the pulse. Generally it is the initial blast of air which achieves the cleaning of the filter, and air which flows through the valve after that initial pulse has discharged will be substantially wasted. It is thus desirable that the valve is only open for as short a period as possible in order to achieve the desired pulse, and thereafter the valve should close quickly to avoid the loss of high pressure air which has only marginal additional cleaning effect, but which adds to the cost of operation.

Where high pressure fluid is used to open the valve it is desirable that the pressure of that fluid is not so high that an operating pressure higher than that generally available within the plant where the equipment is located is required. It is generally desirable that the operating pressure required is somewhat lower than the pressure available at the plant so that even where the plant pressure fluctuates during the day, the operating pressure for the valve is still below the pressure available within the plant. Generally pressure of operation below about 80 psi (550 kPa) is desirable.

However, it is important that the operating system for opening the valve does not serve to decrease the efficiency of the valve by changing the opening speeds, or period of opening, of the valve. If by decreasing the operating pressure the overall efficiency of the valve were reduced, the net result for the system would be less than satisfactory.

SUMMARY OF THE INVENTION

According to one aspect of the invention there is provided a valve comprising:

a valve body having an inlet, an outlet, and a flow passage connecting the inlet and outlet, said inlet, said outlet and said flow passage generally extending axially through said valve body;

a valve seat surrounding the flow passage and a valve closure member movable towards and away from the valve seat to close and open the valve respectively;

the valve closure member comprising:

a poppet-type closure member axially mounted to a stem, the stem having a plurality of pistons spaced apart along the length thereof, the valve body having a plurality of cylinders fixed relative thereto, the pistons each being slidable in a respective cylinder, the closure member being movable by varying the pressure in said cylinders.

Preferably the valve has a rod which is fixed to the body and is axially aligned with the inlet and the outlet, the valve closure member having an axial bore extending therethrough in which the rod is located, the valve closure member being slidable on the rod when the closure member moves between its closed and open positions.

Preferably each of the cylinders has an outlet port through a wall thereof which will be exposed when said closure member has moved towards or into a fully open position, pressure within said cylinders dissipating through said outlet ports when said outlet ports are exposed.

The cylinders are preferably axially aligned with each other, and separated by an end wall, an opening being provide through said end wall through which said stem passes, said pistons being located on opposite sides of said end wall.

Each of said cylinders is preferably supplied with high pressure operating fluid from a pilot valve controlled source of high pressure fluid. A bifurcated flow passage through the valve body may direct operating fluid to said cylinders. Each of said cylinders preferably includes a bleed passage through which high pressure operating fluid may bleed in order for said valve to move to a fully closed position. A spool type pilot valve may be used.

According to another aspect of the invention there is provided a valve comprising:

a valve body having an inlet, an outlet, and a flow passage connecting the inlet and outlet, said inlet, said outlet and said flow passage generally extending axially through said valve body;

a valve seat surrounding the flow passage and a valve closure member movable towards and away from the valve seat to close and open the valve respectively; the valve closure member comprising:

a poppet-type closure member axially mounted to a stem, the stem having at least one piston thereon, the valve body having a cylinder fixed relative thereto, the piston being slidable in the cylinder between a first position in which the valve is closed and the piston is located towards one end of the cylinder, and a second position in which the valve is open and the piston has moved away from said one end, an increase in fluid pressure within said cylinder between said one end and said piston causing said closure member to move to an open position, said cylinder having an outlet port through a wall thereof at a position spaced from said one end such that fluid pressure in said cylinder will at least partially dissipate when said piston moves past said outlet port to open the valve.

These and further features of the invention will be made apparent from the description of embodiments thereof given below by way of examples. In the description reference is made to the accompanying drawings, but the specific features shown in the drawings should not be construed as limiting on the invention.

BRIEF DESCRIPTION OF THE DRAWINGS

FIG. 4 shows an exploded perspective view of the valve shown in FIG. 1 from the inlet side of the valve;

FIG. 5 shows a perspective view of the valve closure member for the valve of FIG. 1.

DETAILED DESCRIPTION OF THE EMBODIMENTS

Figure 1:
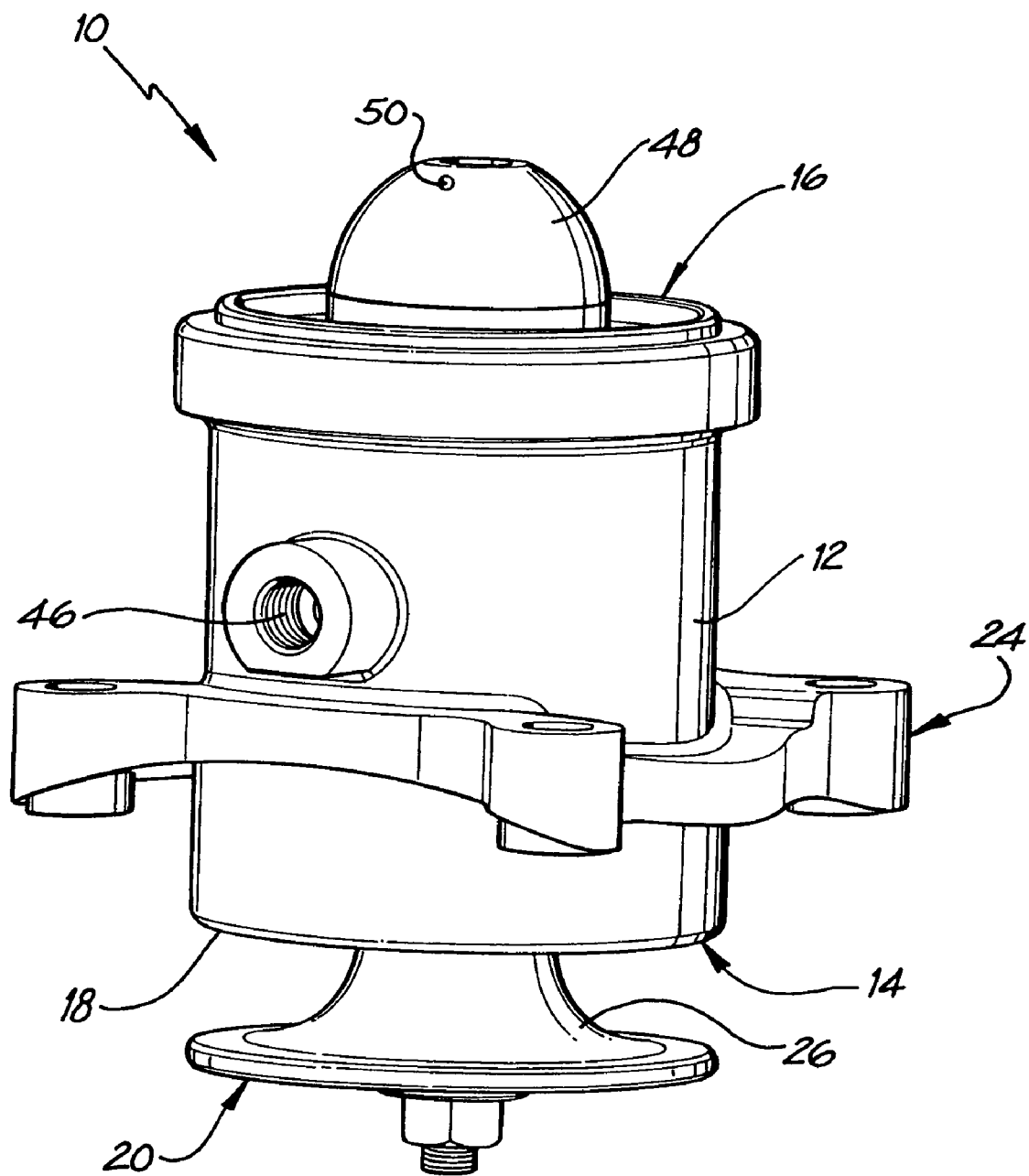
FIG. 1 shows a perspective view of a valve according to the invention.
Figure 2:
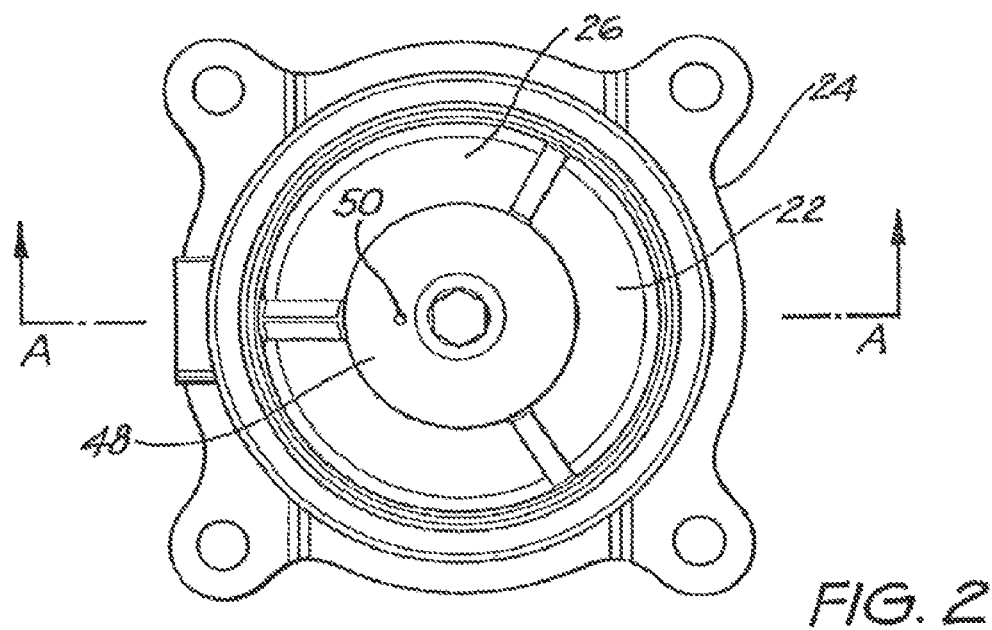
FIG. 2 shows and end view of the valve shown in FIG. 1 from the outlet side of the valve.
Figure 3:
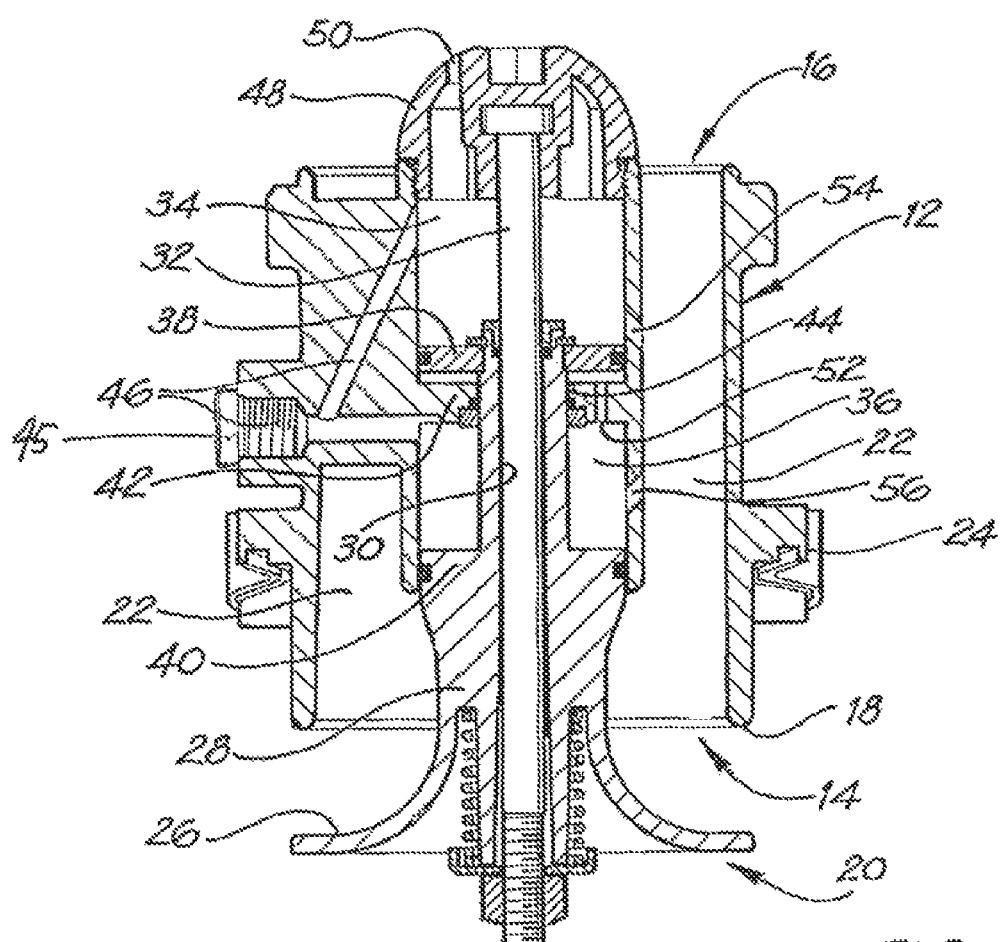
FIG. 3 shows a cross sectional side view of the valve of FIG. 1 along the line A-A depicted in FIG. 2.

Turning to FIGS. 1 to 5, a poppet type valve 10 is shown having a valve body 12 having an inlet side 14 and an outlet side 16. A valve seat 18 is defined on the end face of the body 12 at the inlet side 14 thereof, the valve seat 18 adapted to be engaged by a poppet type valve closure member 20 which is slideable within the body between closed and open positions. The valve is shown in FIGS. 1 and 3 in its open position.

The valve body 12 is of generally hollow cylindrical configuration and a flow passage 22 is defined through the valve body, connecting the end at 14 with the outlet 16. When the valve is open the flow passage 22 is generally unobstructed allowing for discharge of high pressure air or the like from a pressure vessel (not shown) to which the valve is mounted with minimum pressure drop across the valve. The valve is provided with a mounting flange 24 on the outer surface thereof, the mounting flange 24 being used to mount the valve into position in the manner described in patent application PCT/AU02/01716.

The valve closure member 20 comprises a flared closure disk 26 which is adapted to seal with the valve seat 18 and which in turn is mounted to a stem 28. An axial bore 30 passes through the centre of the valve closure member and the stem. A rod 32 affixed to the valve body 12 is axially aligned with the valve body 12, and the valve closure member 20 is slidable on the rod 32 between its open and closed positions. The rod 32 thus keeps the valve closure member axially aligned with the valve body 12.

A pair of axially aligned cylinders, numbered 34 and 36 are located within the valve body 12 and are used for opening the valve. The cylinder 34 is located towards the outlet side of the valve whereas the cylinder 36 is located more towards the centre of the valve. The valve stem 28 carries a pair of pistons numbered 38 and 40 which are slideable in the cylinders 34 and 36 respectively. An end wall 42 separates the cylinder 34 from the cylinder 36. An opening 44 is provided through end wall 42 through which rods 32 and stem 28 pass. Pistons 38 and 40 are located on opposite sides of the end wall 42. High pressure operating fluid is supplied to the respective cylinders 34 and 36 via a flow passage 46.

The rod 32 is mounted to the body by an end cap 48 which screws into the wall of the cylinder 34. A bleed passage 50 is located in the end cap 48 for bleeding high pressure fluid from the cylinder 34 and a bleed passage 52 allows high pressure fluid to bleed from the cylinder 36.

An outlet port 54 is provided from the cylinder 34 and an outlet port 56 is provided from the cylinder 36. These outlet ports 54 and 56 are located in the walls provided to allow for rapid dissipation of high pressure fluid within the cylinders 34 and 36 when the valve closure member 20 has moved towards its open position. This allows for rapid closing of the valve closure member as will be described in more detail below.

In use, with the valve in its closed position, a high pressure fluid within the vessel to which the valve is mounted acts on the outer surface of the valve closure member 20, thereby holding the valve closed. A high pressure fluid will be supplied via passage 46 to the cylinders 34 and 36 thereby causing the valve closure member to move to an open position, to allow for discharge of fluid from the vessel through the flow passage 22.

In a typical application the valve may be used in a pressure vessel adapted to contain air at the pressure of between about 100 and 150 kPa although there is no reason why the valve could not be used with pressures outside this range. It is desirable that the pressure used to open the valve (the cracking pressure) is between about 50 psi (345 kPa) and 80 psi (550 kPa). Clearly the ratios of the diameters of the valve seat 18 and the areas of the pistons 38 and 40 will be selected such that the valve will be able to operate within these parameters.

The dual piston arrangement disclosed herein is desirable since it enables relatively small diameter pistons to be used for opening purposes, and yet the pressure of the operating fluid required to open the valve can be kept relatively low. The low diameter pistons and cylinders located within the valve provide a far reduced obstruction within the flow passage 22, thereby allowing the overall dimensions of the valve to be kept relatively small, and the pressure drop across the valve to be low.

It is desirable that the valve be kept open for a relatively short period of time, say 100 milliseconds or less. Indeed, it is desirable that the valve is kept open for substantially the same time as the pilot valve 45 which controls the supply of pressure fluid via passage 46 is kept open. The pilot valve 45 will generally be an electrically controlled solenoid valve (a spool valve may be used in some applications) and it is desirable that the valve is kept open for substantially the same electrical on time used to switch on the pilot valve 45. If this can be achieved then control of the operating characteristics of the valve can be precisely regulated. Prior art valves have typically had a minimum cycle time of 150 milliseconds or more, so reducing the electrical on time below the cycle time of the valve will have no effect on the efficiency of the valve.

One factor which reduces the closing time of the valve is the back pressure in the cylinders 34 and 36. The bleed passages 50 and 52 will allow dissipation of the pressure within the cylinders relatively quickly. However, it is found that if outlet ports are located in the walls of the cylinders which are exposed when the valve moves towards or into an open position dissipation of the high pressure operating fluid within the cylinders occurs that much more quickly. Thus, the outlet ports 54 and 56 in the cylinders 34 and 36 respectively, serve to allow dissipation of the high pressure fluid in the respective cylinders into the outlet passage 22 as the valve moves into its open position.

In other words, as the pistons 38 and 40 slide up the cylinders in the opening stroke of the valve, they slide past the outlet ports 54 and 56. Allowing the high pressure operating fluid in the cylinders 34 and 36 to discharge into the flow passage 22. With the dissipation of the high pressure fluid in this way the valve quickly moves back to its closed position once the pilot valve 45 is closed. In this way the operating cycle time of the valve is kept to a 1 to 1 ratio with the electrical on time of the pilot valve 45.

The rapid closing of the valve ensures that loss of high pressure fluid from the vessel to which the valve is mounted will be minimised, thereby increasing the overall efficiency of the valve and the system in which the valve operates.

Clearly the cylinders 34 and 36 do not need to be of the same diameter, and the configuration of the stem does not need to be the same as that described herein.

As shown in FIGS. 4 and 5 the piston 38 is held in position with a circlip 60 and will be mounted onto the stem 28 during the assembly process. O-ring seals 62 are provided to ensure that there is no leaking from the cylinders during operation of the valve.

Figure 6:
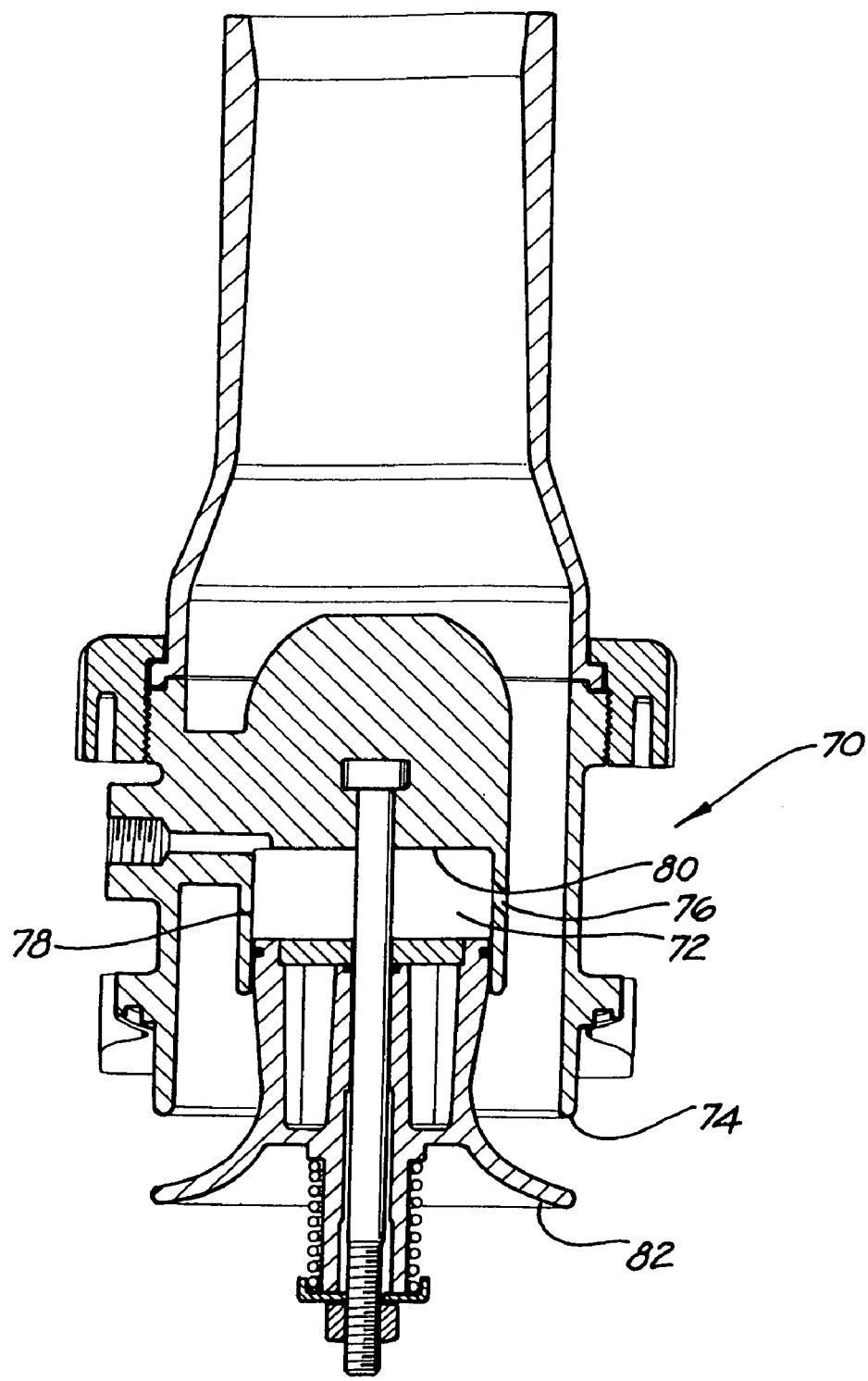
FIG. 6 shows a cross-sectional side view of the second valve according to the invention.

Turning now to FIG. 6 of the drawing, a similar poppet type valve is shown but in this instance the valve 70 has only a single cylinder 72. In order to operate with a relatively low operating pressure the ratio of the diameter of the cylinder 72 relative to the valve seat 74 needs to be increased relative to the previous embodiment. However, it will be noted that an outlet port 76 is provided through a wall 78 of the cylinder at a position remote from the end wall 80 of the cylinder to thereby achieve rapid dissipation of pressure within the cylinder 72 when the valve closure member 82 moves to its open position. Thus, even though a single cylinder is used in this embodiment, the advantages of having an outlet port 76 in the wall of the cylinder to allow for the aforementioned dissipation of high pressure fluid within the cylinder still exist.

The attached table 1 depicts performance of various valves under different operating conditions. The 25 Mill valve is provided for comparison purposes. The valve operates in high pressure systems (620 kPa), but it will be noted that the air consumption with the low pressure systems employing the invention is generally better than the 25 Mill valve system, for a generally similar level of performance.

TABLE 1

| Valve | Tank Vol. $m^3$ | $P^1$ kPa | $P^2$ kPa | Consumption $m^3/s$ | Consumption Δ against 25 Mill % |
|---|---|---|---|---|---|
| 25 Mill | 0.0128 | 620 | n/a | 0.0400 | — |
| Dual Piston | 0.075 | 136 | 414 | 0.0279 | −43.4 |
| Dual Piston | 0.075 | 118 | 414 | 0.0320 | −25.0 |
| Single Piston | 0.075 | 128 | 414 | 0.0436 | +8.3 |

$P^1$ = tank pressure
$P^2$ = cracking pressure

It will be appreciated that there may be many variations to the above described embodiments without departing from the scope of the invention. As has been previously mentioned, the internal configuration of the valve and the relative ratios of the surface areas of the valve closure member and the piston can be altered to suit different operating conditions.

It will be understood that the invention disclosed and defined herein extends to all alternative combinations of two or more of the individual features mentioned or evident from the text or drawings. All of these different combinations constitute various alternative aspects of the invention.

The foregoing describes embodiments of the present invention and modifications, obvious to those skilled in the art can be made thereto, without departing from the scope of the present invention.

The invention claimed is:

1. A valve comprising:
a valve body having an inlet, an outlet, and a flow passage in direct connection with said inlet and said outlet, said inlet, said outlet and said flow passage generally extending axially through said valve body, wherein said inlet defines an opening of said flow passage and said outlet defines an opening of said flow passage;
a valve seat surrounding the flow passage;
a poppet-type valve closure member axially mounted to a stem, said poppet type valve closure member movable towards the valve seat to close the valve, said poppet type valve closure member movable away from the valve seat to open the valve and said stem having a plurality of pistons spaced apart along the length thereof;
a plurality of cylinders fixed relative to said valve body, each of said pistons being slidable in a respective cylinder, said valve closure member being movable by varying the pressure in said cylinders, each of said cylinders is supplied with high pressure operating fluid by a pilot valve controlled source of high pressure fluid, said pilot valve supplies high pressured operating fluid to each of said cylinders, and during said pilot valve off cycle time, said high pressure operating fluid is not supplied to each of said cylinders;
an outlet port disposed from each of said cylinders through said respective cylinder wall and into said flow passage, each of said outlet ports being exposed when said closure member has moved towards or into a fully open position, each of said outlet ports being configured to dissipate said high pressure operating fluid from said cylinder into said flow passage when said outlet port is exposed during the off cycle time of said pilot valve; and
an end cap disposed at an end of said valve opposite said valve closure member, said end cap forming an end wall of one of said cylinders, a bleed passage disposed in the end cap, said bleed passage for bleeding high pressure fluid from said one of said cylinders to said flow passage.

2. A device according to claim 1 having a rod which is fixed relative to the conduit and is axially aligned with the inlet and the outlet, the valve closure member having an axial bore extending therethrough in which the rod is located, the valve closure member being slidable on the rod when the closure member moves between its closed and open positions.

3. A valve according to claim 1 wherein the cylinders are axially aligned with each other and separated by and end wall, an opening being provided through said end wall through which said stem passes, said pistons being located on opposite sides of said end wall.

4. A valve according to claim 3 wherein a bifurcated flow passage through the valve body directs operating fluid to said cylinders.

5. A valve according to claim 1 wherein each of said cylinders includes an additional bleed passage through which high pressure operating fluid bleeds in order for said valve to move to a fully closed position.

6. A valve according to claim 1 wherein the pilot valve is a spool type valve.

7. The valve according to claim 1 wherein said closure member moves toward a fully open position at a pressure between 345 kPa and 550 kPa.

8. The valve according to claim 1 wherein said stem extends longitudinally through substantially the full length of said valve.

9. The valve according to claim 1 wherein said pilot valve on-off cycle time and said valve on-off cycle time is a 1 to 1 ratio.

10. The valve according to claim 1 wherein said outlet port disposed from each of said cylinders through said respective cylinder wall and into said flow passage is in direct communication with said flow passage through said respective cylinder wall.

11. The valve according to claim 1 wherein said flow passage extends longitudinally through a full length on only one section of the stem.

12. The valve according to claim 1 having a rod mounted to the body via the end cap, the valve closure member having an axial bore to receive the rod, the valve closure member slidable on the rod when the closure member moves between its closed and open positions.

13. The valve according to claim 1 the bleed passage oriented in the end cap to bleed fluid out the end of the valve.

14. The valve according to claim 1 the bleed passage connected to the flow passage at the end of the valve.

15. A valve comprising:
a valve body having an inlet, an outlet, and a first flow passage in direct connection with said inlet and said outlet, said inlet, said outlet and said first flow passage generally extending axially through said valve body, wherein said inlet defines an opening of said first flow passage and said outlet defines an opening of said first flow passage;
a valve seat surrounding the first flow passage;
a poppet type valve closure member axially mounted to a stem, the poppet type valve closure member movable toward and away from the valve seat to close and open the valve respectively, and the stem having a plurality of pistons spaced apart along the length thereof;
a plurality of cylinders fixed relative to said valve body, each of said pistons being slidable in the respective cylinder by varying the pressure within said cylinder, each of said pistons being slidable between a first position in which the valve is closed and the piston is located towards one end of the cylinder, and a second piston in which the valve is open and the piston has moved away from said one end;
a second flow passage through said valve body configured to supply pressurized operating fluid to each of said cylinders, said second flow passage having an input port and bifurcated flow lines to each of said cylinders, wherein an increase in fluid pressure within said cylinder between said one end and said piston causes said closure member to move to an open position;
outlet ports disposed respectively through a wall of each of said cylinders and into said first flow passage, each of said outlet ports being exposed when said pistons move toward said second position; and
an end cap disposed at an end of said valve opposite said valve closure member and forming an end wall of one of said cylinders, a bleed passage disposed in the end cap, said bleed passage for bleeding high pressure fluid from said one of said cylinders to said first flow passage.

16. The valve according to claim 15 wherein said pressurized operating fluid is controlled by a pilot valve having an on-off cycle time wherein during an on-time of said pilot valve, said pressurized operating fluid is not supplied to said input port of said second flow passage and during an off-time of said pilot valve, said pressurized operating fluid is not supplied to said input port of said second flow passage.

17. The valve according to claim 16 wherein said valve has an on-off cycle time corresponding to the opening and closing of said poppet type valve closure member, each of said outlet ports are configured to dissipate said pressurized operating fluid from each of said cylinders during the off-time of said pilot valve corresponding to the closing of said valve and said on-time of said pilot valve corresponding to said opening of said valve.

18. The valve according to claim 15 having a rod mounted to the valve body via the end cap, the valve closure member having an axial bore to receive the rod, the valve closure member slidable on the rod when the closure member moves between its closed and open positions.

19. The valve according to claim 15 the bleed passage oriented in the end cap to bleed fluid out the end of the valve.

20. The valve according to claim 15 the bleed passage connected to the first flow passage at the end of the valve.

* * * * *